Aug. 7, 1934.  J. D. LEAR  1,969,225
TIRE VALVE
Filed June 10, 1931
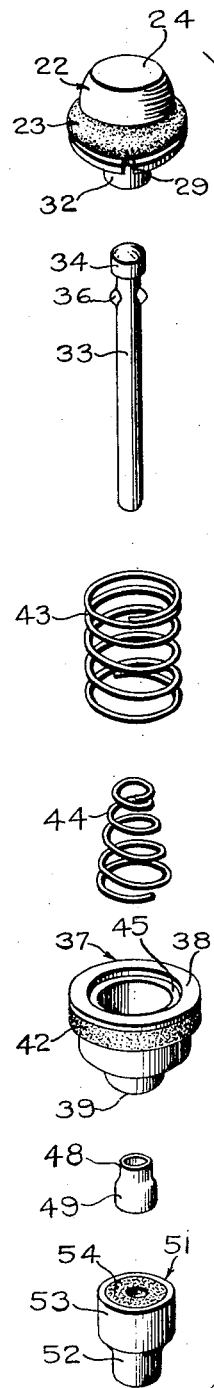
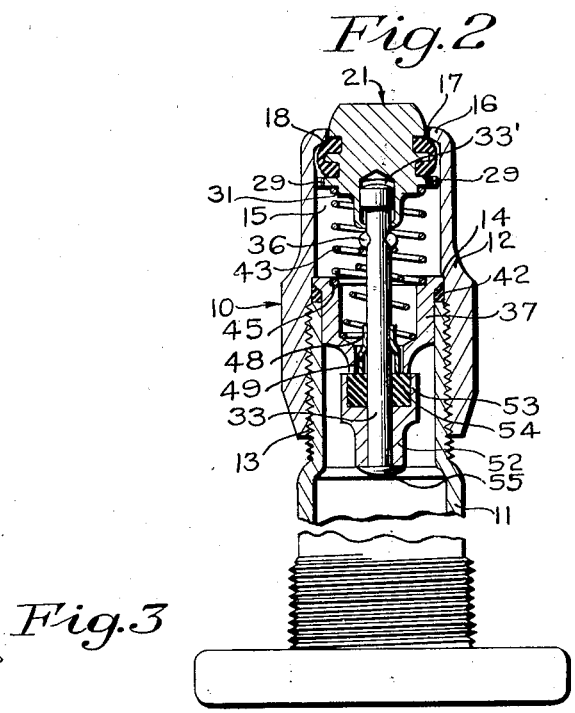
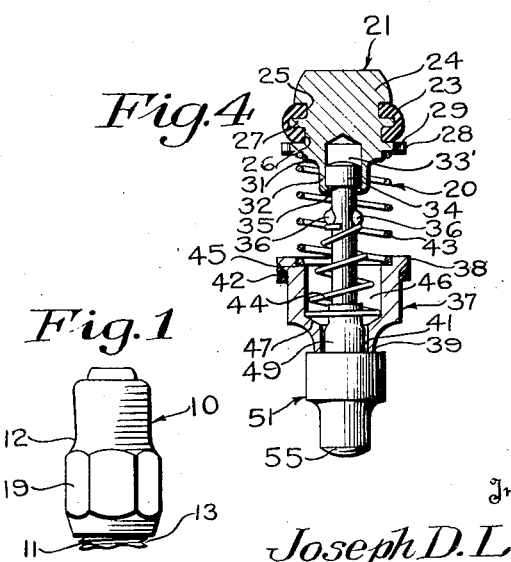
Inventor
Joseph D. Lear
By Bean, Brooks & Henry.
Attorney Patented Aug. 7, 1934

1,969,225

UNITED STATES PATENT OFFICE 1,969,225

TIRE VALVE

Joseph D. Lear, Buffalo, N. Y., assignor to Sterling Automotive Products Corporation, Buffalo, N. Y.

Application June 10, 1931, Serial No. 543,470

6 Claims. (Cl. 152—12)

This invention relates to improvements in valve mechanisms particularly for use with pneumatic tires.

This invention is an improvement on applicant's copending application, Serial No. 505,440, filed December 29, 1930, which discloses a novel combined tire seal and dust cap structure containing a special valve arrangement, eliminating the necessity of locating valves in a tire stem.

The present invention resides in the provision of an improved double valve structure for use in a dust cap such as disclosed in the copending application, wherein through a novel arrangement of valves and associated members, a removable unitary structure is obtained, whose component parts are devised and arranged in such manner as to not only permit a novel cooperation but to effect an economy in production and assembly.

In the drawing:

Fig. 1 is a side elevation of the valve cap unit secured on a stem of a pneumatic tire.

Fig. 2 is a vertical cross section through Fig. 1 on an enlarged scale.

Fig. 3 is a perspective view of the valve unit of Fig. 2 with the parts thereof in disassembled relation arranged in their preferred order of assembly.

Fig. 4 is a vertical cross section through the valve unit prior to insertion and mounting in the housing.

The invention comprehends the use of a valve cap 10 removably secured over the extremity of a stem 11 of a pneumatic tire in a similar manner as a "dust" cap in well-known previously used devices of the similar nature. The cap 10 is utilized to contain all the valve means necessary to form an effective air and dust seal for the tire.

A housing or shell 12 provides a protecting and mounting means for the valve means and is tubular in shape and provided at one end with an interior threaded portion 13 for attachment to a valve stem or the like, (Fig. 2). Immediately adjacent the threaded portion 13, the shell is reduced in diameter to form a mounting shoulder 14 defining one extremity of a cylindrical chamber 15 of reduced diameter. The outer end of the shell is provided with an inturned annular flange 16 forming an opening 17 communicating with chamber 15. The interior wall of the flange 16 is angular relative the walls of the chamber and forms valve seat 18. The shell is provided with an exterior hexagonal portion 19 suitable for cooperation with a wrench or other tool for securing the valve cap to the stem 11.

As shown in Fig. 4, the valve mechanism is formed of a number of interconnected and associated parts forming a valve unit 20, which is easily insertable and removable from the interior of the shell 12 upon removal of the same from the stem 11.

The unit 20 includes an outer air valve 21 which is adapted to seat on the seat 18 of the shell. This member is preferably formed of two parts, a cylindrical body 22 and a resilient seating portion 23 mounted about the body 22. The body is provided with an extension or button head 24, and spaced annular grooves 25 and 26 forming therebetween a flange 27. The seating portion 23 is preferably a section of resilient material such as rubber tubing mounted under tension over the flange 27 so that its ends enter into the grooves 25 and 26. An annular guide flange 28 formed on the body is of larger diameter than flange 27 and spaced therefrom by groove 26.

The flange 28 contains spaced air entry notches 29 at its periphery for permitting fluid communication between the opening 17 and chamber 15 of the shell when the valve 21 is unseated. The lower extremity of the body 22 is reduced in diameter to form an annular spring seat 31 and further reduced to form a hub 32. The hub contains an axial recess 33' extending into the body.

The outer valve 21 is adapted to be mounted within the chamber 15 of the shell 12 with its guide flange 28 in sliding engagement with the walls of the chamber to arrange the seating portion 23 in concentricity therewith in spaced relation. The seating portion is engageable with the outer valve seat 18 and when in such position, the head 24 protrudes through the opening 17 of the shell 12.

A rod 33 provides means for connecting the members in the unit 20, and in addition acts as a guiding means for a second, or inner valve member. The rod is provided with a head 34 which is slidably inserted within the recess 33' in the outer valve 21. Upon inserting the rod the walls of the hub 32 are turned inwardly by a suitable tool to form a retaining portion 35 to slidably engage the body of the rod. The head 34 is thus mounted for limited movement between the upper extremity of the recess and the retaining portion 35. The body of the rod is also provided with spring seats 36 formed out of the same.

The seating member 37 for a second valve hereinafter described is a hollow cylindrical member having a radial annular mounting flange 38 at one extremity and a portion of reduced diameter at its opposite extremity forming an inner valve seat 39 provided with a concentric opening 41. A packing member 42 is arranged about the member 37 adjacent the mounting flange 38.

The mounting flange 38 of the member 37 is adapted to engage the mounting shoulder 14 of the shell 12 when the unit 20 is mounted therein. An annular depression or spring seat 45 is formed in the top surface of the seating member 37 to mount one extremity of the spring 43, the opposite extremity of which engages about the seat 31 of the outer valve 21. An inner valve spring chamber 46 is also formed through the same side of the member 37 and terminates in an inner valve spring seat 47 spaced from the valve seat 39 and communicating with the opening 41.

The inner valve spring 43 is seated on the seat 47 of member 37 and extends upwardly beyond the chamber to engage the spring seats 36 on the rod 33.

The rod 33 is inserted through the chamber 46 and opening 41 of the seating member, and a tubular valve centering member 48 is pressed or otherwise secured thereon. The centering member is provided with an angular skirt portion 49 which slightly clears the walls of the opening 39 of the seating member 37.

An inner valve 51 is secured to the portion of the rod 33 protruding beyond the member 37. The valve is of suitable form to engage the inner valve seat 39 and preferably comprises a mounting member having a mounting portion 52 and a cup portion 53 adapted to receive resilient seating member 54 therewithin. Both the mounting member and seating member are perforated to receive the rod 33 which is secured with the seating member in a suitable manner, such as by riveting as at 55 to complete the assembly of the unit 20.

In the completed unit 20 shown in Fig. 4, the spring 43 is compressed and acts to separate the outer valve 21 from the seating member 37. The separating action is resisted by the head 34 of rod 38 which engages the retaining portion 35 of the same, thereby retaining the component parts of the structure in assembled relation.

The unit 20 is insertable within the shell 12, with the seating portion 23 of the outer valve 21 engaging the seat 18 of the shell and with the guide flange 28 slidably engaging the wall of the chamber 15 of the shell. When in this position, the mounting flange 38 of the seat member 37 is slightly spaced from the mounting shoulder 14 of the shell and the packing member 42 engages the threaded portion of the shell to frictionally retain the unit 20 in position within the shell.

The cap valve thus assembled is screwed on tire stem 11 until the upper extremity of stem 11 extends into the space between the seat member 37 and the shell, and engages the packing member 42, thus forcing the flange 38 into engagement with the mounting shoulder 14 of the shell 12, against the action of the outer valve spring 43. As shown in Fig. 2, this causes an upward disposal of the rod head 34 in recess 33' of the outer valve 21 to a position spaced from both the upper extremity of the recess and the retaining portion 35. Coincidently the stem is sealed against air escape through the connecting threads 12 or into the chamber 15 of the shell by the packing member 42 and against escape through the open top of the shell by the two independently seated valves 21 and 51.

From the above, it will be seen that the valve cap may be easily applied to the present type of tire stems to form the only air seal therefor. Thus, the old form of valve unit which is screwed within the stem is eliminated. This feature, in itself, permits advantageous economies in the structure of the stem, as the usual internal set of threads and internal seat may be eliminated to allow the periphery of member 37 to slidably engage the smooth inner wall of the stem.

What is claimed is:

1. A cap member adapted to be secured to a tire stem comprising a housing open at opposite ends and provided at one end with means for securing to a stem, said housing being formed with a cylindrical chamber, a pair of spaced circular valve seats within the housing chamber in concentricity therewith, a valve on one of said seats and having an extension protruding through the unsecured end of the housing, guide means on said valve slidably engaging the wall of the chamber for retaining said valve in concentricity therewith, said valve being formed with an axial orifice, a valve on the remaining valve seat, a rod secured to the last named valve and extending into the orifice of the first valve, a head on the rod slidably guided in the orifice, means for retaining the rod head in the orifice of the first valve for limited axial movement therein, centering means on the rod adjacent the second valve adapted to engage portions of the adjacent seat to guide the second valve to concentric seating position thereon, and a resilient means for each valve for retaining each valve on its respective seat.

2. In a valve cap having a housing open at opposite ends and provided at one end with means for attachment to a tire stem and at the opposite end with an internal seat, the combination of a removable valve unit comprising a valve member having an axial recess, a second valve spaced from said first valve, a hollow seat member for the second valve spaced from said first valve, resilient means extending between said first valve and the seat member, a rod secured to the second valve and extending through the seat member into the recess of the first valve, cooperating means on the rod and first valve for retaining the rod in the recess for limited axial sliding movement, and a second resilient means on the seat member engaging the rod to retain the second valve on its seat, said cooperating means retaining said first valve in assembled relation with said rod and accompanying second valve and seat member, said valve unit being insertable in the housing with the first valve engaging the seat therein, said valve cap when engaged on said stem having its seat member engaged thereby and moved upwardly to compress the spring of said first valve and to move the cooperating means out of engagement.

3. In combination with a tire stem, a valve cap comprising a cylindrical housing formed with a cylindrical chamber open at opposite ends and provided at one end with means for attachment over the tire stem and at the opposite end with an internal concentric seat, a shoulder in the housing spaced from the seat, a valve seating on the seat and having a guide portion slidably engaging the inner wall of the housing, a hollow seat member having a portion engaged between the shoulder in the housing and the extremity of the stem, a seat on the seat member extending into the stem, a valve on the seat, a rod secured at one end to the valve and extending through the seat member, cooperating means on the rod and first mentioned valve for mounting the remaining end of the rod for limited axial movement whereby prior to the application of the cap to the stem, said second valve and seat are retained against disassembly from the chamber by the engagement of said cooperating means on the rod and first valve and independent resilient means for retaining each valve on its seat.

4. An an article of manufacture, a valve unit comprising a valve having an axial recess, a second valve spaced from the first valve, a hollow seat member for the second valve, a spring extending between the seat member and the first valve, a rod secured to the second valve and extending through the seat member and into the recess in the first valve, a second spring member secured to said rod and extending to the seat member for retaining the second valve on its seat, and cooperating means on the first valve and the rod for retaining said rod in the recess of the first valve, for limited axial movement, said rod retaining the valves, springs and the seat member in assembled relation.

5. A cap member adapted to be secured to a tire stem, comprising a housing formed with a cylindrical chamber open at opposite ends and provided at one end with means for securing to a stem, a pair of spaced valve seats within the housing chamber, a valve on each seat, one of said valves being mounted for guided axial movement in the housing chamber, rod means connected at one end to the second valve and having a head portion on its opposite end, said first valve being formed with a portion having a recess for slidably receiving the head portion of the rod, said head portion being axially spaced from the bottom wall of the recess of said portion, retaining means on said portion of the first valve for engaging said head portion against disengagement from the recess therein, and resilient means for each valve for urging each valve to its respective seat.

6. In a cap member for a tire valve stem, a housing having an open chamber formed with an integral valve seat at one extremity and with means for securing to a valve stem at the opposite extremity, a removable valve seat in said housing chamber spaced from said integral seat, a valve on the integral seat having a portion extending through the housing, a valve on the second seat, resilient means mounted on the removable seat for urging each valve to its seat, and means extending through said second seat and loosely connecting said valves, to retain said valves in assembled relation when withdrawn from the housing through the open chamber thereof, said means and said second valve cooperating to retain the second seat and accompanying resilient means in the assembly during such withdrawal.

JOSEPH D. LEAR.